United States Patent [19]

McMurtry

[11] 4,333,238
[45] Jun. 8, 1982

[54] COORDINATE MEASURING MACHINE

[76] Inventor: David R. McMurtry, 'Undercroft', Wotton-under-Edge, Gloucestershire, England

[21] Appl. No.: 136,091

[22] Filed: Mar. 31, 1980

[30] Foreign Application Priority Data

Mar. 30, 1979 [GB] United Kingdom ............... 7911329

[51] Int. Cl.³ .......................... G01B 7/00; G01B 7/28
[52] U.S. Cl. ............................... 33/174 L; 33/169 C; 33/174 P; 33/174 PC
[58] Field of Search ............ 33/174 L, 172 E, 169 R, 33/169 C, 174 P, 179.5 D, 179.5 R, 1 M, 174 PC

[56] References Cited

U.S. PATENT DOCUMENTS

| | | | |
|---|---|---|---|
| 3,750,295 | 8/1973 | Nordmann et al. | 33/174 L |
| 3,774,312 | 11/1973 | Ecsh | 33/174 L |
| 3,987,551 | 10/1976 | Kienle | 33/174 L |
| 4,084,323 | 4/1978 | McMurtry | 33/174 L |
| 4,168,576 | 9/1979 | McMurtry | 33/174 L |
| 4,228,591 | 10/1980 | Sterki et al. | 33/174 L |

*Primary Examiner*—Willis Little
*Attorney, Agent, or Firm*—Spencer & Kaye

[57] ABSTRACT

A machine for measuring a workpiece is adapted to move a probe (10) relative to a workpiece to be measured, the measurement being determined by an electronic scale (25) when the probe contacts the workpiece (8). If the measurement is taken while the probe is in a state of acceleration, the deflection of those parts (e.g. 11) of the machine which extend between the probe and the scale falsifies the measurement. The invention provides an accelerometer (30) to determine the acceleration and thereby the deflection. A computer is arranged to determine the true measurement by taking account of the deflection.

3 Claims, 4 Drawing Figures

COORDINATE MEASURING MACHINE

BACKGROUND OF THE INVENTION

This invention relates to coordinate measuring machines having structure supporting a probe for movement relative to a workpiece to be measured and relative to a means for continually measuring the position of the probe relative to a datum, the probe having means for generating a signal when having a predetermined relationship with a proximate surface of the workpiece. In operation, the probe is moved toward a said surface and the signal is used to determine the output of the measuring means at the instant when the probe attains said predetermined relationship thereby to determine the position of said surface relative to said datum.

To speed up the measuring operations it is the practice to move the probe rapidly from one to the next of the surfaces to be measured. However, this practice is limited by dynamic deflection of the support structure. In other words, if, at the instant when said signal is generated, the probe is subject to acceleration or deceleration, the measurement is different from what it would be if the probe had a constant velocity. If this difference is greater than a given tolerance the measurement is useless. It is an object of this invention to overcome or reduce this difficulty.

SUMMARY OF THE INVENTION

According to this invention there is provided a method of determining a measurement of a workpiece on a machine comprising structure supporting a probe for movement relative to a workpiece to be measured and relative to a means for continually measuring the position of the probe relative to a datum, the probe having means for generating a measuring signal when having a predetermined relationship with a proximate surface of the workpiece; the method comprising:

(a) moving the probe toward said surface,
(b) determining dynamic deflection of said structure at the instant of said signal, and
(c) adjusting the output of the measuring means to take account of said deflection.

Also according to this invention there is provided a machine for determining a measurement of a workpiece comprising;

(a) a probe having means for generating a measuring signal when having a predetermined relationship to a proximate surface of the workpiece,
(b) structure supporting the probe for movement relative to the workpiece,
(c) means for continually measuring the position of the probe during said movement relative to a given datum,
(d) means for determining dynamic deflection of said structure at the instant of said signal, and
(e) means responsive to said deflection for adjusting the output of the measuring means to take account of said deflection.

The dynamic deflection may be determined by sensing any parameter on the machine which is affected by a change of speed of the probe.

Measurements of a said parameter are converted into measures of corresponding displacements of the probe from the position which it would have when at rest or at a uniform speed, and the displacement measure is then added to or subtracted from, as the case may require, the actual measurement recorded by the measuring means.

Said parameter may be acceleration as measured by, for example, an accelerometer on a moving part of the machine, a strain gauge on a moving or stationary part of the machine, or a torque meter on a shaft, or a current meter in a motor, used for driving the machine.

BRIEF DESCRIPTION OF THE DRAWINGS

An example of a machine and a system according to this invention will now be described with reference to the accompanying drawings wherein.

DESCRIPTION OF THE PREFERRED EMBODIMENTS

Figure 1:
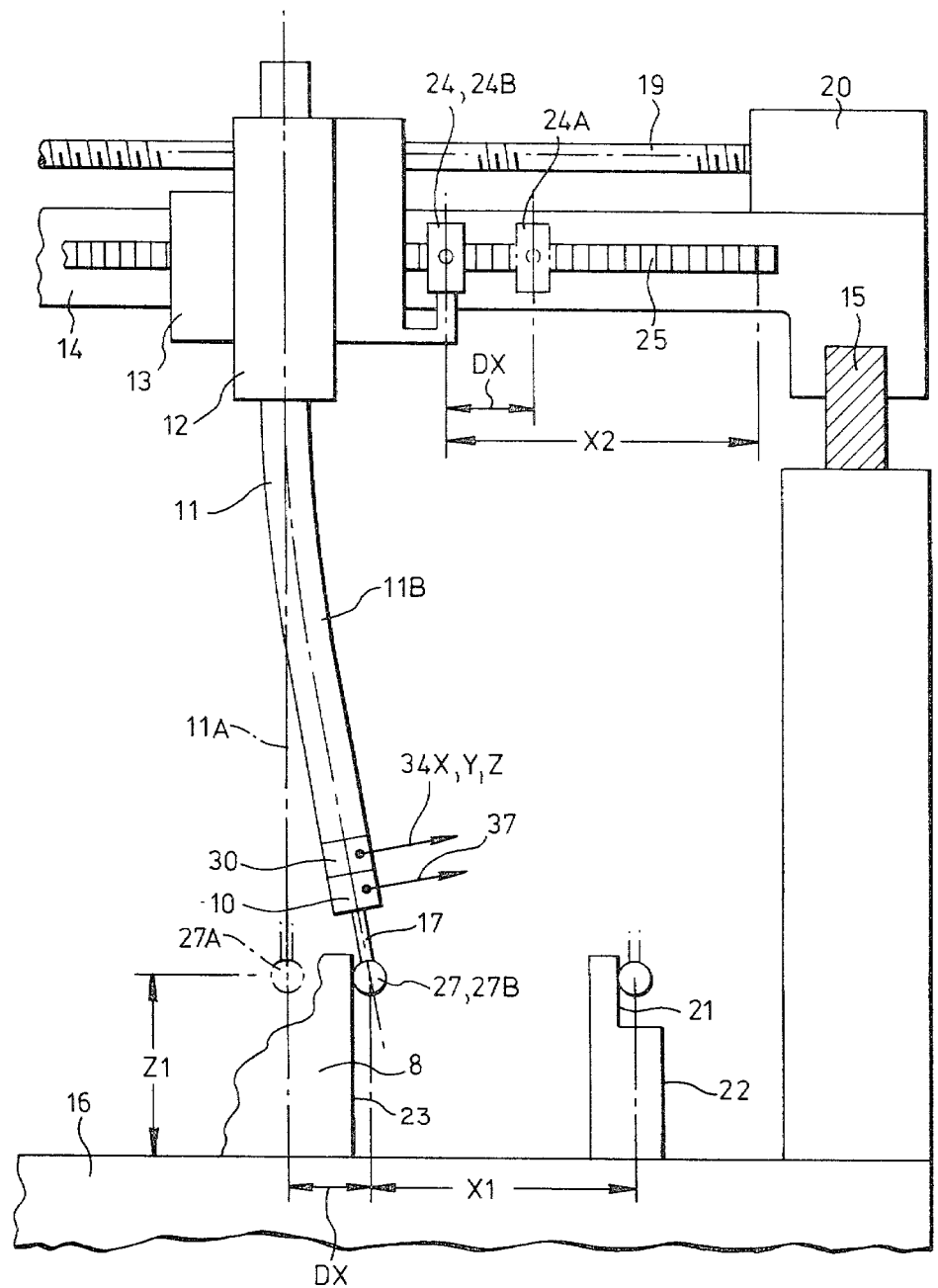
FIG. 1 is an elevation of the machine.
Figure 2:
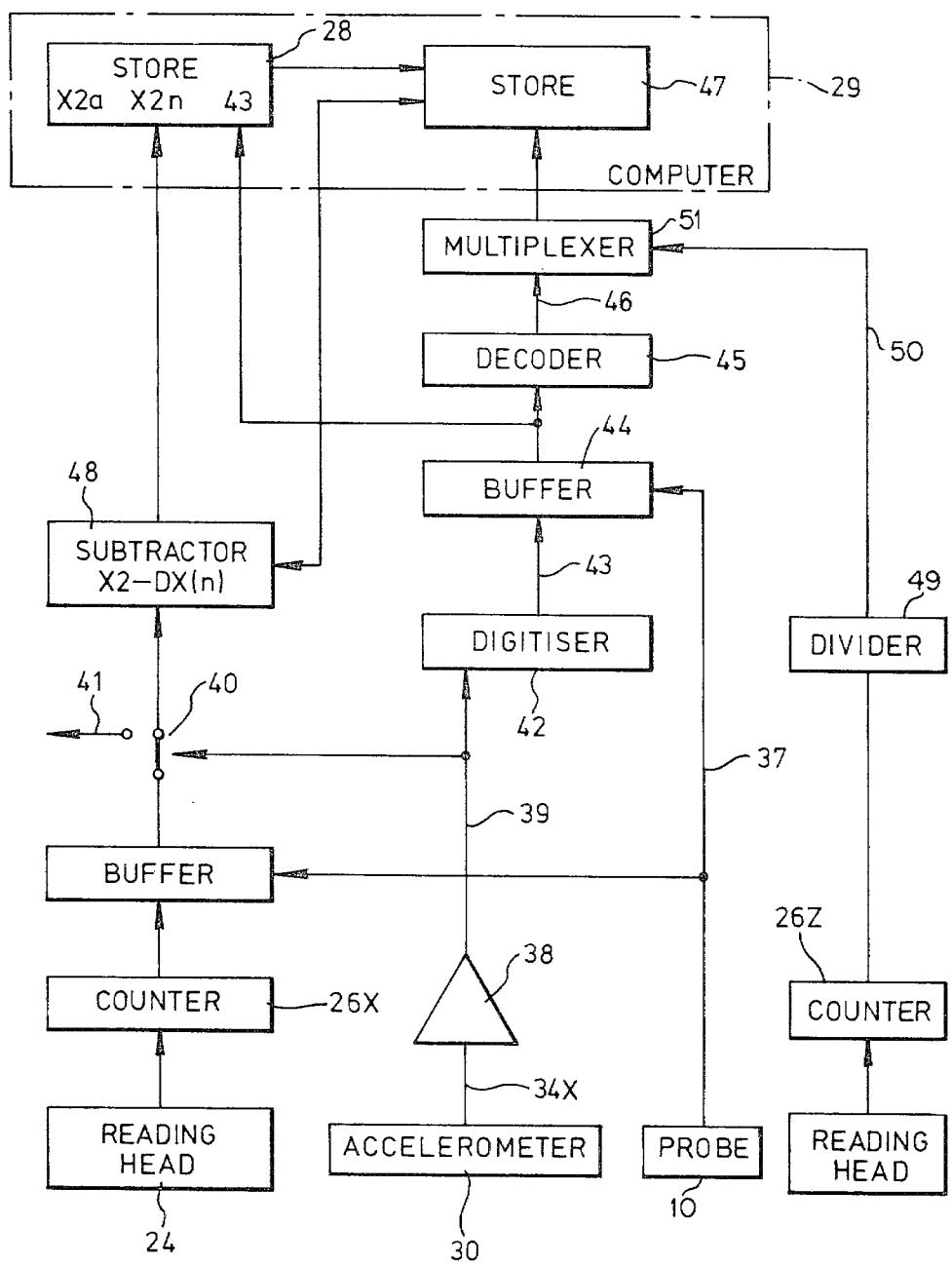
FIG. 2 is a diagram of the system.

Referring to FIG. 1, the machine comprises a probe 10 supported for movement in the X, Y and Z directions of the orthogonal coordinate system. To this end the probe 10 is secured to the bottom end of a vertically extending elongate member or quill 11 supported for movement in the Z direction by a bearing 12 which is integral with a carriage 13 supported for movement in the X direction by a beam 14. The latter is supported for movement in the Y direction by a track 15 mounted on a table 16. The probe 10 has a stylus 17 having a spherical sensing end 27 whereby to engage a workpiece 8 to be measured. Let it be assumed that a measurement has to be carried out in the X direction and that it is intended to determine a distance X1 between a face 21 of a datum block 22 and a face 23 of the workpiece 8. This operation involves moving the carriage 13 in the X direction along the track 14 by means of a screw 19 rotated by a motor 20 secured to one end of the beam 14. The actual measuring is carried out by an opto-electronic reading head 24 secured to the carriage 13 and movable together therewith along a scale 25 secured to the beam 14. The output of the reading head is read by a counter 26X (FIG. 2).

It will be understood that similar screw and motor devices (not shown) are provided for moving the quill 11 through the bearing 12 and for moving the beam 14 along the track 15 and that the probe 10 is at first moved by the latter devices into the Y and Z directions so that the X measurement is taken at the desired YZ location. Also, the motor 20 is at first operated to place the sensing end 27 against the datum surface 21 and that the counter 26X is set to zero in response to a signal 37 output by the probe at the instant of engagement between the sensing end 27 and the surface 21. Special care is taken to ensure that the probe is moved at a slow uniform datum speed against the surface 21 to avoid falsification of the zero setting by inertia effects.

Similar zeroing operations are of course also carried out in respect of the Y and Z dimensions. Each such operation usually involves halting the probe immediately after the measurement is taken and accelerating the probe to the next measuring point. After such zeroing the machine is ready for all measuring operations pertaining to that zero, and it is understood that the one measurement to be described is the first of many, often hundreds, of such operations which have to be carried out on a complex workpiece. To make this work economical, the operations have to be carried out in rapid succession, but the more rapidly the movable members are moved, the greater is the possibility of the measurements being falsified by inertia effects. This will now be described in detail.

As the motor 20 is driven to accelerate the carriage in the X direction from the zero position or from any one position of rest, the member 11, which under steady conditions lies on a centre line 11A, is bent by the inertia of the member 11 to lie on a centre line 11B. In this connection, the member may be regarded as a cantilever supported at the bearing 12 and deflecting relative to that bearing and to the carriage 13. The sensing end 27, which under steady conditions has a position 27A therefore takes up a position 27B spaced from the position 27A by a deflection DX shown to an exaggerated extent. The actual dimension of the deflection DX may be of the order of a few micrometer. The sensing end 27 therefore engages the workpiece later than it would have done if there had been no deflection of the member 11. It is assumed that the acceleration has taken place at a uniform rate so that the speed of the probe increases quadratically to the distance travelled and the deflection DX has remained unchanged right up to the time of engagement with the workpiece. At the time of such engagement the sensing head 24 has a position 24B in advance of a position 24A which it would have under steady conditions. The distance X2, measured by the reading head is therefore greater than the distance X1 by the amount DX.

The probe 10 itself may be of any kind having means for outputting a signal 37 when the probe, more specifically a sensing element of the probe, has a predetermined relationship with the workpiece. In the present example the sensing element is the stylus 17 and its sensing end 27, and the signal 37 is produced by electrical contacts 38 (FIG. 3) whereby the stylus 17 is supported on a housing 36. The contacts change the state of an electrical circuit when a force acting on the stylus changes the state of the contacts. The signal 37 is used to stop the motor 20 and initiate the next measuring operation. Inasmuch as the probe overruns the measuring point by a small amount this is accommodated by tilting of the stylus on the contacts. The signal 37 is also used to transfer the instantaneous reading of the counter 26X to a main store 28 of a computer 29 used for processing the measurements made by the machine.

As described so far the machine is known or does not form part of this invention. It will be clear that the accelerations at which such a machine can be operated are limited by the above deflections.

Figure 3:
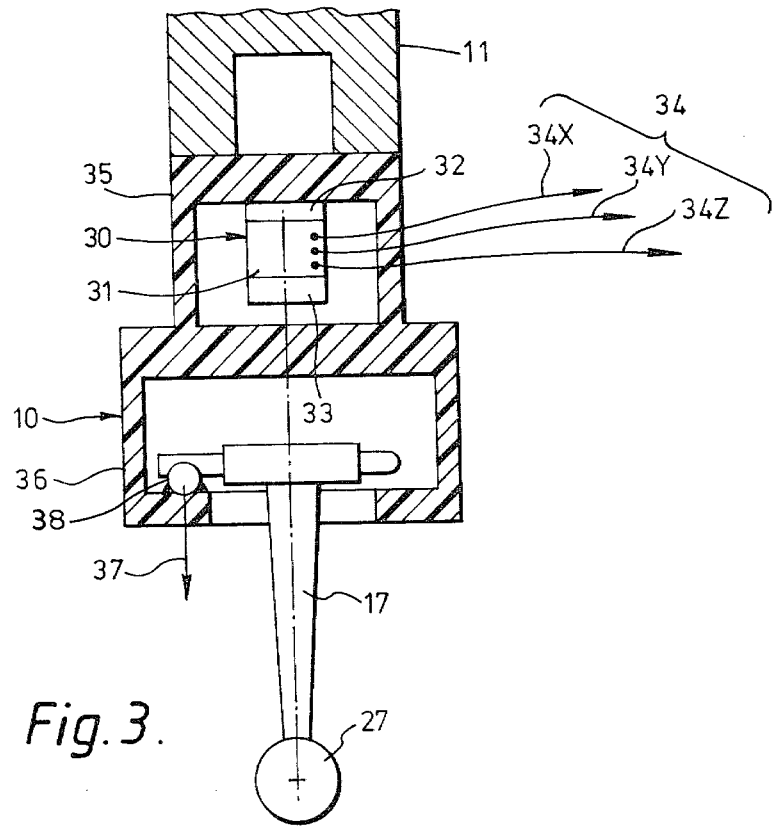
FIG. 3 is an enlarged part of FIG. 1 showing details of a probe and of an accelerometer.

To overcome the above inertia effects the invention provides a means for generating a signal showing that the distance DX is in excess of an allowable minimum. In the present example this is done by an accelerometer 30 provided in or adjacent the probe 10. As shown in FIG. 3, the accelerometer 30 comprises a known arrangement of piezoelectric crystals 31 connected between a base 32 and a free mass 33, Three outputs 34X, 34Y, 34Z, also collectively referred to as the outputs 34, are derived from the crystals to carry the electric currents generated in respect of inertia forces acting on the mass 33 in the X, Y and Z direction respectively. The accelerometer 30 is mounted in a housing 35 directly connected between the member 11 and the housing 36 of the probe.

The outputs 34 are connected to respective threshold amplifiers 38 (only one shown in FIG. 2) whose output 39 is proportional to the magnitude of the signals 34 when the latter exceed a certain predetermined threshold corresponding to an acceptable maximum of deflection of the member 11.

The outputs 39 may be used to act on a switch 40 to inhibit the transfer of the counter output to the store 28 and to output a signal 41 used to indicate that the measuring operation should be repeated at a lower speed. This use of the accelerometer output applies especially if the motor 20 is operated by the operator applying manual force to the member 11. However, insofar as the machine is operated by a computer programme the following system is preferred.

The signal 34 is connected to a digitiser 42 which converts the varying level of the signal 34 into a corresponding binary signal 43. The signal 43 is taken through a buffer store 44 and decoder 45 whose output 46 is an address of a correction store 47. The latter store contains a list of actual values DX(n) of the deflection DX for corresponding values of the signal 34X. The signal 37 is connected to the buffer store 44 to transfer the value held at the instant of the signal 37 through the decoder 45 into the store 47 which responds by outputting the value DZ(n) present in the address concerned to a subtractor 48. The latter is connected between the counter 26X and the store 28 and is adapted to form the difference X2−DX(n) which difference is of course the true value of the distance X1.

The different values of DX(n) held in the store 47 are found by a calibration process. This involves moving the carriage 13 to bring the probe 10 into engagement with a test piece, say the workpiece 8. At first the carriage 13 is driven at the same slow uniform speed as that used for setting the zero of the counter 26X at the datum block 22. This establishes a base reading X2a at the counter 26 which should be equal to the distance X1. Thereafter, the carriage run is repeated a number of times at progressively increased accelerations. For each run of the carriage the output X2n of the counter 26X at the instant of the signal 37 is recorded in the store 28 against the content of the buffer store 44. The differences X2n−X2a=DXn for the different values of X2n are then produced and are entered into the store 47 at the addresses corresponding to the outputs of the buffer store 44 and decoder 45. These calibrations of the machine can be carried out readily with the aid of the computer 29.

The system has been described with reference to the X dimension. A similar system is provided for the Y dimension. In view of the stiffness of the member 11 in the Z dimension, the system would not normally be required for that dimension but the machine would of course have, for the Z dimension, a scale, reading head and counter similar to those described for the X dimension. The counter for the Z dimension is shown at 26Z in FIG. 2.

Reverting to the calibration of the machine, different values of DX(n) are produced at different regions of the coordinate field above the table 16 because the deflection DX is the greater the further the probe 10 is from the bearing 12, i.e. the greater the unsupported length of the member 11. Therefore the machine is calibrated for different heights Z1 (FIG. 1) of the sensing end 27 above the surface of the table 16. To this end the counter 26Z (FIG. 2) is connected through a dividing circuit 49 to produce a correct signal 50 at intervals of, say, 15 cm during movement of the sensing end from its lowest to its highest position above the table 16. The calibration is carried out at every one of those intervals and the signal 50 is used to work a multiplexer 51 to direct the decoder output 46 to the appropriate part of the store 47.

Figure 4:
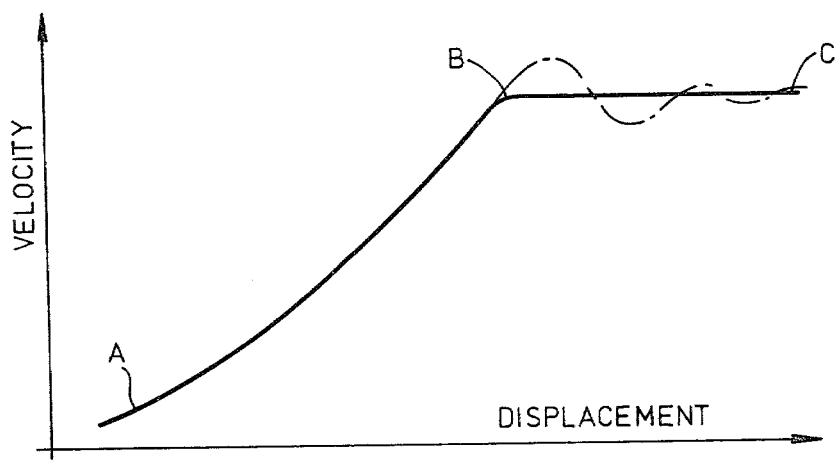
FIG. 4 is a velocity diagram.

Referring to FIG. 4, there is shown a curve showing the acceleration of the probe 10 between points A and B. At this time the acceleration may be uniform to raise the speed of the probe to a maximum at the correspondingly high rate. On attaining the maximum at point B, this being the highest speed at which the motor 20 can be driven, the probe initially oscillates due to vibration of the member 11 where projecting from the bearing 12. The oscillations die down and the probe speed attains a uniform value, say, at a point C. The accelerometer 30 will of course respond to the vibrations and act to correct the reading accordingly. Alternatively the accelerometer may be used to inhibit the reading by means of the switch 40 for as long as the excursions of the oscillations are above an acceptable minimum.

It will be appreciated that, instead of being mounted at the probe, the accelerometer may be mounted on the carriage 13 and a correction routine similar to that described may be based on the latter position of the accelerometer. Instead of using an accelerometer, a strain gauge may be used at any position subject to stress in response to the acceleration of the probe.

The above described calibration of the machine involved measuring the displacement of the probe for different accelerations. It will be appreciated that the displacement can be calculated by the computer 29 on the basis of the acceleration and of known deflection formulae.

The computer 29 is an electronic digital computer and the subtractor 48 may exist in hard-wired or in software form.

I claim:

1. A method of determining a measurement of a workpiece on a machine comprising a probe, structure supporting said probe for flexile and translational movement relative to a workpiece to be measured and relative to a means for continually measuring the position of the probe relative to a datum, the probe having means for generating a signal when having a predetermined relationship with a proximate surface of the workpiece; said method comprising the steps of:
   (a) moving said probe toward said surface;
   (b) determining the output of said measuring means at the instant said signal is generated thereby defining the measured position of said probe;
   (c) determining the deflection of said structure at said instant thereby defining the difference between the measured and the actual positions of said probe; and
   (d) subtracting said difference to said output of the measuring means to establish a measure of the actual position of said probe.

2. A machine for determining a measurement of a workpiece comprising:
   (a) a probe having means for generating a signal when having a predetermined relationship to a proximate surface of said workpiece;
   (b) structure supporting said probe for flexile and translational movement relative to said workpiece;
   (c) means for continually measuring the position of said probe, during said translational movement thereof, relative to a datum;
   (d) means for determining the output of said measuring means at the instant said signal is generated thereby defining the measured position of said probe;
   (e) means for determining the deflection of said structure during said flexile movement thereof, at the instant said signal is generated thereby defining the difference between said measured and actual positions of said probe; and
   (f) means for subtracting said difference to said output of the measuring means to establish a measure of the actual position of said probe.

3. A machine for determining a measurement of a workpiece, comprising
   (a) an elongate member;
   (b) a guide supporting said member at one end thereof for motion in the direction perpendicular to the length of said member, the other end of said member being free;
   (c) a stylus provided at the free end of said member for engagement with said workpiece;
   (d) means provided at said one end of said member for continually measuring said motion and thereby continually determining a measurement of the position of said stylus relative to a datum, said member being subject to deflection from a rest position due to acceleration during said motion whereby an error may occur between the measurement as determined by the measuring means and the actual position of said stylus;
   (e) means for measuring said acceleration;
   (f) means for determining a measurement of said deflection responsive to a measurement of said acceleration; and
   (g) means for subtracting said deflection measurement to said position measurement in the sense of compensating for said error.

* * * * *